UNITED STATES PATENT OFFICE.

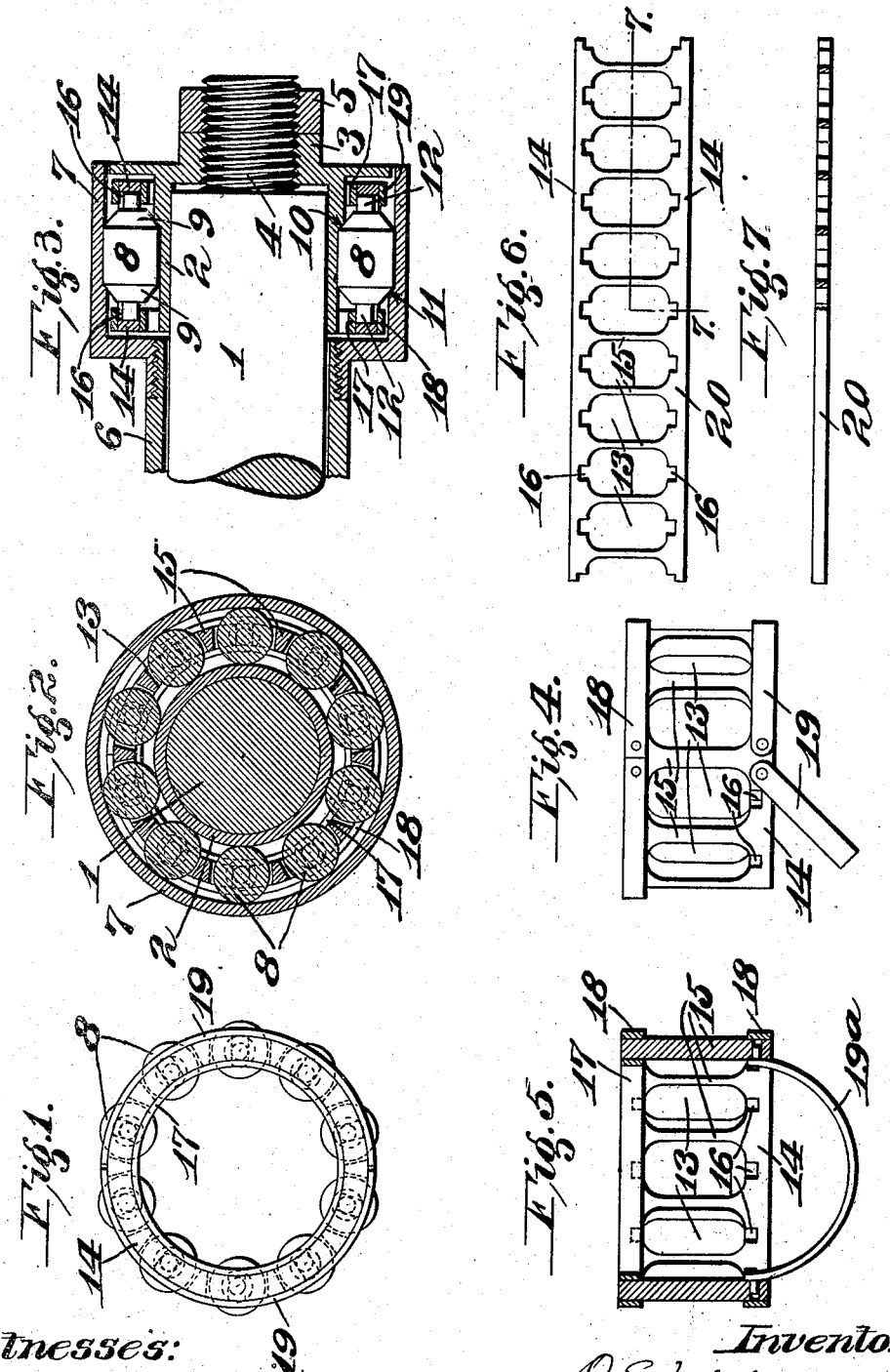

ONESIME E. MICHAUD, OF ST. LOUIS, MISSOURI.

ROLLER-BEARING.

933,320.  Specification of Letters Patent.  Patented Sept. 7, 1909.

Application filed December 5, 1908. Serial No. 466,049.

*To all whom it may concern:*

Be it known that I, ONESIME E. MICHAUD, a citizen of the United States, and a resident of the city of St. Louis and State of Missouri, have invented a new and useful Improvement in Roller-Bearings, of which the following is a specification.

This invention relates to roller bearings. It has for its principal objects to simplify the construction, facilitate the manufacture and minimize the cost of spacing frames or cages for the rollers; to facilitate the ready assembling and removal of the rollers; and to attain certain other advantages hereinafter more fully appearing.

The invention consists in the parts and in the arrangements and combinations of parts hereinafter described and claimed.

In the accompanying drawing, which forms part of this specification and wherein like symbols refer to like parts wherever they occur, Figure 1 is an end elevation of a circular spacing frame or cage embodying my invention with the rollers in position thereon; Fig. 2 is a cross section through the outer end portion of an axle and a roller bearing thereon embodying my invention; Fig. 3 is a longitudinal section of the arrangement shown in Fig. 2; Fig. 4 is an edge view of a spacing frame or cage embodying my invention with the rollers removed; Fig. 5 is a longitudinal section of a modification of the spacing frame or cage; Fig. 6 is a flat face view of a perforated strip or blank for a further modification of the spacing frame or cage; and, Fig. 7 is partly an edge view and partly a longitudinal section of the blank as indicated by the line 7—7 of Fig. 6.

In the drawings, the end portion 1 of an ordinary vehicle axle is shown. On the axle is sleeved a bearing ring or sleeve 2. Preferably the ring or sleeve 2 is provided with a screw threaded nut portion 3 which is adapted to fit the reduced, screw-threaded, outer end portion 4 of the axle. A jam nut or other suitable locking device 5 may also be provided for the bearing ring 2.

Surrounding and spaced from the axle portion 1 is a hub sleeve or bushing 6. The hub sleeve is provided with an enlarged circular end portion or bearing ring 7 which is adapted to coöperate with the inner bearing ring 2. Interposed between the two bearing rings 2 and 7 are a series of rollers 8. The end portions of these rollers are preferably beveled as at 9 so as to bear against or coöperate with counterpart shoulders 10, 11, on the bearing rings 2, 7, respectively. Extending axially from each end of the several rollers are spindles 12 which are adapted to loosely fit seats or pockets provided therefor in the spacing frame or cage.

The spacing frame or cage comprises, preferably, an integral circular ring or body portion which is provided with a series of elongated perforations 13. These perforations are shaped to substantially correspond with and accommodate the rollers 8 which are of smaller dimensions so as to be loosely and freely mounted therein. By the arrangement of the series of perforations 13 the body member of the spacing frame constitutes in effect a pair of spacing rings or annular portions 14 which are connected by cross members 15.

The thickness of the body member of the spacing frame is slightly greater than the diameter of the roller spindles 12, and the body member is oppositely notched at each end of the several elongated perforations or slots 13 centrally thereof as at 16 so as to loosely receive said roller spindles 12. As shown in Figs. 1 to 4, inclusive, narrow rings or strips 17 are riveted or otherwise secured on the inner side of the marginal ring portions 14 so as to overlie the notches 16. On the outer side of one of the marginal ring portions 14 is secured a ring or strip 18 which also overlies the notches 16 opposite to its companion ring or strip 17. On the outer side of the other marginal ring portion 14 are preferably hingedly mounted two semicircular bails or strips 19 which are adapted to be swung off of said marginal ring portion 14 when it is desired to place the rollers on the cage frame or remove them therefrom. The arrangement of the circular strips or rings overlying the notches 16 at the ends of the slots or perforations 13 provides retaining pockets or seats for the end spindles 12 of the rollers. By providing the two movable semicircular bails or strips 19 the rollers may be easily and readily placed on the spacing frame or cage. That is, the rollers may be mounted on one-half of the cage at a time, thereby obviating the necessity and overcoming the difficulty of holding the entire series of rollers in place until the movable securing ring or bails are closed on the margin ring portion.

In placing the rollers on the cage, it is only necessary to swing the bail off of the marginal ring portion 14 as shown in Fig. 5, and holding the cage with the uncovered notches uppermost, the rollers may be placed by inserting one of their end spindles into the companion covered notches and then dropping their opposite end spindles into said uncovered notches. The bail or movable securing member 19 may then be closed. Obviously, the rollers will be as easily and readily removed.

In Fig. 5, the bails 19ª are placed on the inner side of the marginal ring portion 14. In other respects this modification is similar to that hereinbefore described.

In Figs. 6 and 7 a blank 20 for a further modification of the spacing frame or cage is shown. In this case the body portion is formed from a perforated strip. That is, the strip may be punched or otherwise perforated and then formed into a ring and tempered if so desired.

Obviously, the device may be further modified without departing from my invention, and, therefore, I do not wish to be limited to the exact constructions and arrangements herein shown.

What I claim as my invention and desire to secure by Letters Patent is:

1. A roller bearing comprising a series of spaced rollers having axial end spindles, and a spacing frame for said rollers comprising a pair of rigidly connected annular portions, one of said annular portions having a series of longitudinally inwardly opening recesses therein, and the other of said annular portions having a series of longitudinally inwardly and radially opening recesses therein which are arranged in companion relation to said first-mentioned series of recesses, and removable means for covering the radial opening of said last mentioned recesses.

2. A roller bearing comprising a series of spaced rollers having axial end spindles, and a spacing frame for said rollers comprising a pair of rigidly connected annular portions, one of said annular portions having a series of longitudinally inwardly opening recesses therein, and the other of said annular portions having a series of longitudinally inwardly and radially opening recesses therein which are arranged in companion relation to said first-mentioned series of recesses, and removable means for covering the radial opening of said last mentioned recesses, said means comprising two oppositely disposed semi-circular bails which are hingedly connected to the ring.

3. In a roller bearing, a spacing cage comprising a pair of rigidly connected annular portions, one of said annular portions having a series of longitudinally inwardly opening recesses therein, and the other of said annular portions having a series of inwardly and radially opening recesses therein which are arranged in companion relation to said first mentioned series of recesses and removable means for covering the radial opening of said last mentioned series of recesses.

4. In a roller bearing, a spacing cage comprising a pair of rigidly connected annular portions, one of said annular portions having a series of longitudinally inwardly opening recesses therein, and the other of said annular portions having a series of inwardly and radially opening recesses therein which are arranged in companion relation to said first-mentioned series of recesses, and removable means for covering the radial opening of said last mentioned series of recesses, said means comprising two semicircular bails which are hingedly attached to the ring.

5. In a roller bearing, a spacing cage comprising an integral annular body member having an annular series of perforations therein and the opposite longitudinal ends of said perforations being slotted medially, annular strips secured around the inner and the outer side of said annular body member at the margin thereof so as to overlie the notched portions of said perforations, an annular strip secured around the opposite marginal portion of said annular body member so as to cover the notched portions of said perforations on one side of said body member, and a removable strip secured over said last mentioned notches on the side of said body member opposite to said last mentioned covering strip.

6. In a roller bearing, a spacing cage comprising an integral annular body member having an annular series of perforations therein and the opposite longitudinal ends of said perforations being slotted medially, annular strips secured around the inner and the outer side of said annular body member at one margin thereof so as to overlie the notched portions of said perforations, an annular strip secured around the opposite marginal portion of said annular body member so as to cover the notched portions of said perforations on one side of said body member, and movable means adapted to cover said last mentioned notches on the side of said body member opposite to said last mentioned covering strip.

7. In a roller bearing, a spacing cage comprising an integral annular body member having an annular series of perforations therein and the opposite longitudinal ends of said perforations being slotted medially, annular strips secured around the inner and the outer side of said annular body member at one margin thereof so as to overlie the notched portions of said perforations, an annular strip secured around the opposite marginal portion of said annular body member so as to cover the notched portions of said perforations on one side of said body member, and movable means adapted to cover the said last mentioned notches, said means comprising two semicircular bails which are hingedly attached to said body member on the side opposite to said last mentioned covering strip.

8. A spacing cage for roller bearings comprising a single strip constituting an annular perforated body member, the perforations having medially notched longitudinal end portions, annular covering strips for said notches arranged around said annular body member on opposite sides at one margin thereon, a cover strip arranged around said body member on one side at the opposite margin thereof, and removable covering means for said opposite notches on the side of said body member opposite to said last mentioned cover strip.

Signed at St. Louis, Missouri, December 1, 1908.

ONESIME E. MICHAUD.

Witnesses:
G. A. PENNINGTON,
J. B. MEGOWN.